United States Patent
Averbuch et al.

(10) Patent No.: US 12,288,374 B1
(45) Date of Patent: Apr. 29, 2025

(54) FEATURE EXTRACTION BY DIRECTIONAL WAVELET PACKETS FOR IMAGE PROCESSING BY NEURAL NETWORKS

(71) Applicants: Amir Averbuch, Tel Aviv (IL); Valery Zheludev, Tel Aviv (IL)

(72) Inventors: Amir Averbuch, Tel Aviv (IL); Valery Zheludev, Tel Aviv (IL)

(73) Assignees: Amir Averbuch, Tel Aviv (IL); Valery Zheludev, Tel Aviv (IL)

( * ) Notice: Subject to any disclaimer, the term of this patent is extended or adjusted under 35 U.S.C. 154(b) by 463 days.

(21) Appl. No.: 17/563,523

(22) Filed: Dec. 28, 2021

Related U.S. Application Data (60) Provisional application No. 63/132,503, filed on Dec. 31, 2020.

(51) Int. Cl.
*G06V 10/00* (2022.01)
*G06V 10/44* (2022.01)
*G06V 10/82* (2022.01)
*G06V 10/88* (2022.01)

(52) U.S. Cl.
CPC ............ *G06V 10/454* (2022.01); *G06V 10/82* (2022.01); *G06V 10/893* (2022.01)

(58) Field of Classification Search
CPC ..... G06V 10/454; G06V 10/82; G06V 10/893
See application file for complete search history.

(56) References Cited

U.S. PATENT DOCUMENTS

| | | | | |
|---|---|---|---|---|
| 2002/0057752 | A1* | 5/2002 | Denno | H03D 3/009 375/346 |
| 2003/0081836 | A1* | 5/2003 | Averbuch | G06T 7/12 382/199 |
| 2017/0147734 | A1* | 5/2017 | Rosenbluth | G06F 30/367 |
| 2020/0349411 | A1* | 11/2020 | Luo | G06N 3/084 |
| 2021/0048521 | A1* | 2/2021 | Leduc | G01S 13/75 |
| 2021/0128077 | A1* | 5/2021 | Voss | A61B 5/7253 |

* cited by examiner

*Primary Examiner* — Md K Talukder
(74) *Attorney, Agent, or Firm* — Nathan & Associates Patent Agents Ltd.; Menachem Nathan (57) ABSTRACT

Methods and systems that replace convolutional layers of a convolutional neural network (CNN) with quasi-analytic directional wavelet packet (qWP)-based filters, and which use the qWP-based filters to perform filtering and extract features from image data. The extracted features are then used by the CNN to perform a classification task. The results of the classification task are output to a user.

17 Claims, 10 Drawing Sheets

FIG. 1 KNOWN ART

FIG. 2 KNOWN ART

FEATURE EXTRACTION BY DIRECTIONAL WAVELET PACKETS FOR IMAGE PROCESSING BY NEURAL NETWORKS

CROSS REFERENCE TO RELATED APPLICATIONS

This application claims the benefit of U.S. provisional patent application No. 63/132,503 having the same title and filed Dec. 31, 2020, which is incorporated herein by reference in its entirety.

FIELD

Embodiments disclosed herein relate in general to image processing and in particular to feature extraction for image classification.

BACKGROUND

Computer vision and artificial intelligence systems have been revolutionized by Deep Learning methods, most notably Convolutional Neural Networks (CNN) and Deep Convolutional Neural Networks (DCNN)—CNN and DCNN will be used hereinafter interchangeably—which achieve unprecedented accuracies on a range of tasks. The use of DCNN is assimilated in a wide range of products and applications such as classification and recognition, autonomous cars, segmentation, face recognition, tracking, IoT, FinTech and cyber. A major reason for the widespread adoption of CNNs is their improved accuracy compared to previous techniques. Accuracy is only one of several desirable properties of a machine learning system.

DCNNs exhibit state-of-the-art accuracy in image classification on large-scale image datasets. However, they exhibit poor performance in classification utilizing very small ("tiny") dataset, since their large number of parameters over-fits training data.

Figure 1:
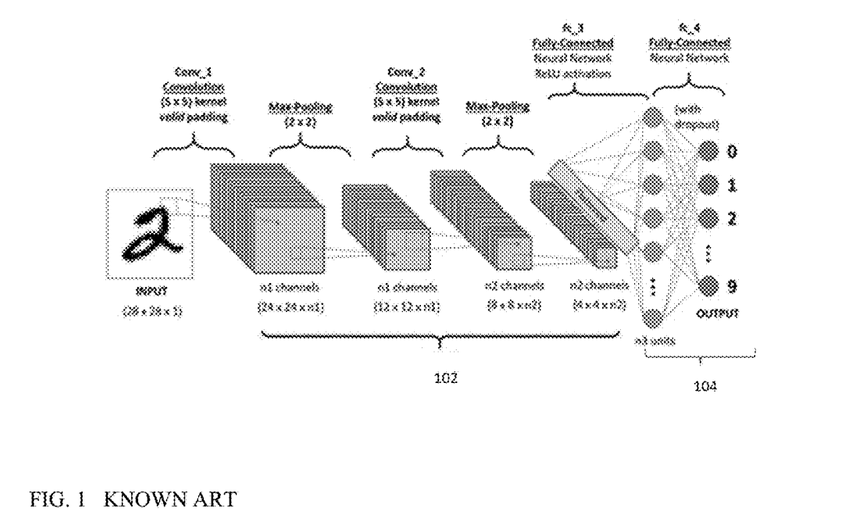
FIG. 1 shows pictorially a common known art CNN architecture.
Figure 2:
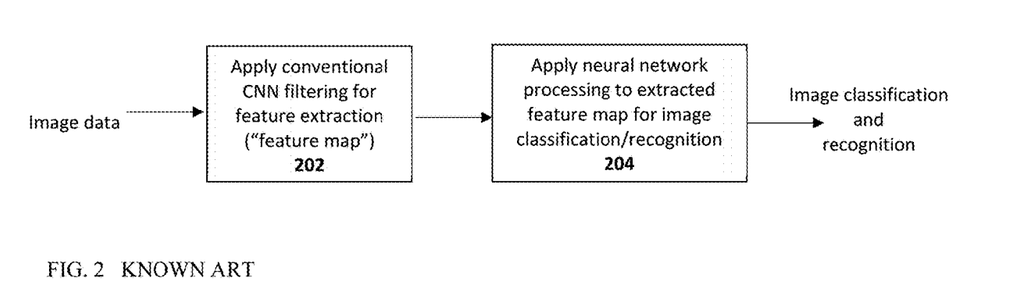
FIG. 2 shows the CNN architecture of FIG. 1 in a flow chart.

FIGS. 1 and 2 show a common known art CNN architecture and its use. FIG. 1 shows the architecture pictorially and FIG. 2 shows an end-to-end schematic flow chart. Typically, a CNN for classification tasks includes a set of convolution layers and fully connected layers at the beginning and the fully connected layers on top of those convolutional layers. The convolutional layers extract image features in a layered hierarchical structure. The convolutional layers tend to learn generic features such as edges, texture, intensity and color information.

With reference to FIG. 2, in conventional CNN use, the convolutional layers perform filtering and extract features in step 202 and the fully connected layers process perform a classification task using the extracted features for image recognition/classification in step 204. The convolutional layers extract characteristic features from the training data by convolving the input data with filters derived in the training process. Consequently, the structure of the filters and the meaning of the extracted features remain unclear. Such a scheme requires a huge amount of data and a large number of convolutional layers whose number is unknown in advance.

If a huge amount of data is processed, CNNs are capable of achieving better performance in visual recognition than humans, but the features are unexplainable (meaningless). A DCNN requires large datasets to generalize the model properly and to avoid overfitting. In such cases, the DCNN perform exceptionally well with a good learning capacity, since a large number of convolutional layers is able to handle a large number of extracted parameters/features from the dataset.

Despite their excellent performance, modern CNNs are surprisingly inefficient regarding the size of the training data, the number of convolutional layers and the meaning of the extracted features and their contributed benefits. Many attempts have been made to classify images using CNN with small (or "tiny") training datasets, but such attempts face the overfitting problem because of direct training. The low performance caused by a small training dataset is due to the quality of the extracted features. This leaves the challenging question of whether shallow architectures (with a limited number of convolutional layers) are capable of capturing all the needed features from a small training dataset to describe the topology and the detailed descriptions in the image. Therefore, recent approaches avoid direct training and improve the performance by transfer learning approaches and with some other techniques. One way to overcome the data limitations is by data increase through different techniques such as augmentation that generates virtual data. Another popular way is by deep transfer learning (DTL). In practice, DTL uses a pre-trained CNN, which is trained with a large amount of data such as ImageNet for the source model. To train with tiny datasets, the learned knowledge from one application domain is transferred to another relevant domain.

There is therefore a need for, and it would be advantageous to have systems and methods that use tiny datasets in which the process of extracting characteristic features provides features that are explainable, i.e. have physical meaning that fit the topology of the image and this is much faster than in known art, i. e. is substantially "real time".

Notations qWP denotes quasi-analytic directional wavelet packet (also referred to interchangeably as "directional wavelet packet");
sWP denotes spline-based wavelet packet;
cWP denotes complimentary wavelet packet;
* denotes complex conjugation; FM denotes feature map;
$X_{\pm}$ means $X_+$ and $X_-$;
1D and 2D denote one-dimensional and two-dimensional, respectively.

SUMMARY

According to some aspects, it is determined that some or all of the convolutional layers in a CNN (or DCNN) can be replaced by filtering with filters that are generated independently of any image, are classified as generic (universal) filters, and that fit to the structure (topology) of the image. This replacement removes the need for large training data, allowing use of "tiny" training datasets. If tiny datasets are used, there is no need for the knowledge learned from one application domain to be transferred to another relevant application domain. The resulting CNN or DCNN may be referred to as a "modified CNN" or "modified DCNN".

In various embodiments, the filters replacing the convolutional layers are quasi-analytic directional wavelet packet (qWP)-based filters (or simply "qWP-based filters"). The qWP-based filters are generic, universal and independent of any specific imaging. They are constructed from waveforms. Image processing methods disclosed herein and using qWP-based filters may be applied among others and for example to image classification, object segmentation, object tracking, medical image analysis, autonomous cars and real-time imaging applications. For simplification, the term "image classification" used in this description and claims is to be understood as covering all types of known classifications, for example of objects, signals and other types of data.

The qWPs possess the following properties:
- are oriented in multiple directions (for capturing edges and other image features);
- have oscillating structure with multiple frequencies (for representing texture patterns);
- have vanishing moments at least locally (for sparse representation of smooth regions);
- have good localization in the spatial domain;
- DFT spectra of the qWPs produce a refined frequency separation;
- qWPs transform coefficients have a clear (explainable) physical meaning; the transform coefficients are the inner products of a signal/image with shifts of the corresponding qWPs that are derived by an iterated multirate filtering of signal/image;
- fast implementation of the qWPs transforms.

According to some aspects, there is disclosed a system for extracting high quality, versatile, directional and explainable features from tiny datasets that represent meaningful components in the image. These features, extracted by the application of qWP-based filters, compensate for the need to have huge data for training DCNN and to have many convolutional layers for achieving robust and accurate classification. The basic architecture of CNN in FIG. 1 is modified drastically to utilize efficiently the strength of qWPs. A new "modified CNN" is described (see step 302 in FIG. 3). An end-to-end schematic flow process for training and classification is described in FIGS. 14 and 15, respectively. The processes accommodate the new architecture that produces features to be utilized by neural networks for robust and accurate results in image classification, object segmentation, object tracking, medical image analysis, autonomous cars, real-time imaging applications and other applications knows to use CNNs/DCNNs.

The modified CNN/DCNN topology is based on replacing the convolutional layers with convolution by qWP-based filters. This modification enhances the quality of a network's feature extraction capabilities to provide close to real-time processing (by using off-the-shelf hardware components) through ability to learn from tiny datasets. In sharp contrast with conventional CNN/DCNN topologies, the extracted features are explainable, i.e. have a physical meaning. This results in simplifying a CNN/DCNN architecture and providing better adaptive processing of images.

In various examples, there is provided a method, comprising: applying qWP-based filtering to image data to extract feature maps; applying neural network (NN) processing to the extracted feature maps to classify an object and/or an image; and outputting the classified object and/or image to a user. The neural network may be a convolutional neural network.

In some examples, the applying qWP-based filtering to image data is preceded by generating qWPs using discrete or polynomial splines, and by using the generated qWPs to obtain the qWP-based filters.

In some examples, the applying of qWP-based filtering to image data to extract feature maps includes applying the qWP-based filtering to training image data to extract training-based feature maps in a training stage, and applying the qWP-based filtering to a new image to extract a new feature map in a classification stage.

In some examples, the applying of NN processing to the extracted feature maps to classify the object and/or image includes using the training-based feature maps and the new feature map for classification of the object in the new image and/or of the entire new image.

In various examples, there is provided a system, comprising: a processing unit configured to apply qWP-based filtering to image data to extract feature maps; a NN classifying engine configured to apply NN processing to the extracted feature maps to classify an object and/or an image; and an interface or input/output device for outputting the classified object and/or the image to a user.

In some examples, the processing unit configuration to apply qWP-based filtering to image data to extract feature maps includes a configuration to generate qWPs using discrete or polynomial splines, and to use the generated qWPs to obtain qWP-based filters used in the qWP-based filtering.

In some examples, the processing unit configuration to apply qWP-based filtering to image data to extract a feature map includes a configuration to apply the qWP-based filtering to training image data to extract training-based feature maps in a training stage, and to apply the qWP-based filtering to a new image to extract a new feature map in a classification stage.

In some examples, the NN classifying engine configuration to apply NN processing to the extracted feature maps to classify the object and/or the image includes a configuration to use the training-based feature maps and the new feature map to classify the object in the new image and/or the entire new image.

In various examples, there is provided a method, comprising replacing convolutional layers of a CNN with qWP-based filters; using the qWP-based filters to perform filtering and extract features from training image data; using fully connected layers of the CNN to perform a classification task using the extracted features to classify an object and/or an image; and outputting the classified object and/or image to a user.

In some examples, the replacing of the convolutional layers of a CNN with qWP-based filters includes replacing all of the convolutional layers of the CNN with the qWP-based filters.

In some examples, the replacing of the convolutional layers of a CNN with qWP-based filters is preceded by generating qWPs using discrete or polynomial splines, and by using the generated qWPs to obtain the qWP-based filters.

In some examples, the using of the qWP-based filters to perform filtering and extract features from image data includes applying the qWP-based filtering to training image data to extract training-based feature maps in a training stage, and applying the qWP-based filtering to a new image to extract a new feature map in a classification stage.

In some examples, the using of fully connected layers of the CNN to perform a classification task using the extracted features includes using the training-based feature maps and the new feature map to perform the classification task.

In some examples, a method disclosed herein is performed in a vehicle.

In some examples, a system disclosed herein is included in a vehicle.

A method disclosed herein has the following inventive properties:
  a) feature extraction using qWP-based filters that replace the convolutional layers in CNN/DCNN while exploring their invariance properties regarding rotation and translation;
  b) predefined qWP-based filters that are generic and universal, i.e. they do not depend on any specific imaging and are performed once;
  c) design of adaptive feature extraction schemes;
  d) assigning a physical explanation and meaning for the extracted features;
  e) automatic image generation for training by applying translation and rotation to the training data;
  f) a fast software (SW)-based processing package, with a performance that is close to real time on off-the-shelf components.

A system and method described herein are beneficial for many real world application areas that require image recognition/classification and tracking with limited (tiny) data and with meaningful features. Exemplary areas include object segmentation, object recognition, object tracking, video analysis, scene understanding, medical image analysis, self-driving cars, face recognition and other real-time applications, since many areas struggle with huge data dependence of deep learning. Such systems and methods also open the way to new CNN-based applications implementable on off-the-shelf-components.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way. In the drawings.

DETAILED DESCRIPTION

Figure 3:
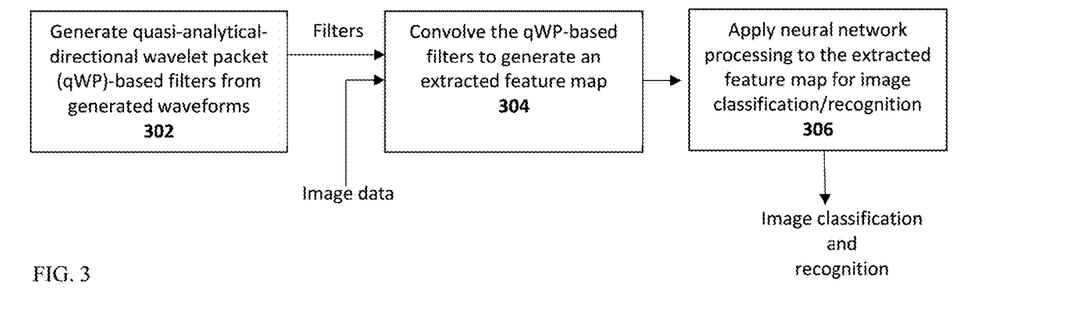
FIG. 3 shows a flow chart of a method according to aspects of the presently disclosed subject matter.

FIG. 3 shows a flow chart of an embodiment of a method disclosed herein. qWP-based filters are generated from generated waveforms in step 302. The qWP-based filters and image data are convolved to generate an extracted features map in step 304. Neural network processing is applied to the extracted features map for image classification or recognition in step 306.

In contrast with the use of a conventional CNN in step 302 of FIG. 2, filtering and feature extraction in step 304 of FIG. 3 is done using qWP-based filters. That is, no (or very few) convolutional layers are used to perform filtering and extract features. The extracted features are then fed into NN processing (step 306) in a way similar to that in step 204 of FIG. 2.

Figure 4:
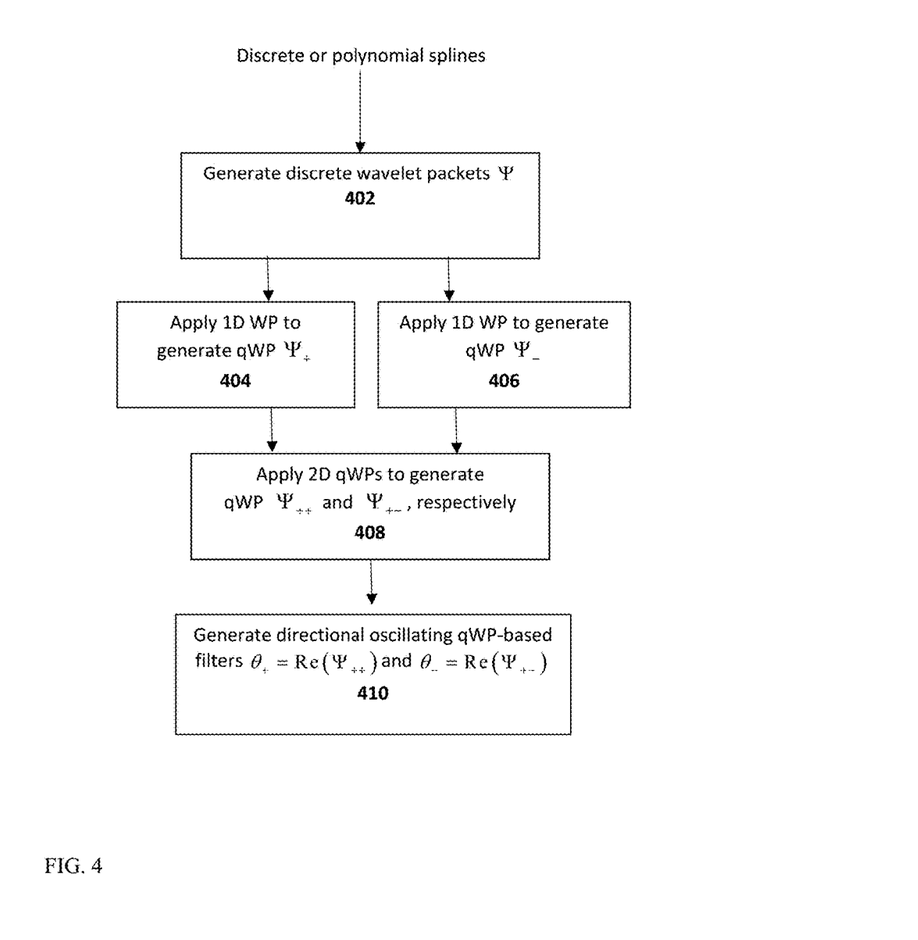
FIG. 4 shows the flowchart of the steps that generate directional oscillating qWPs from discrete or polynomial splines.

FIG. 4 shows the flowchart of the steps that generate qWPs from discrete or polynomial splines. The end result of FIG. 4 is not just qWPs, but oscillating qWPs $\theta$. Discrete or polynomial splines are used to generate discrete quasi-analytical wavelet packets $\Psi$ in step 402. A 1D transform is applied twice to T to generate a qWP $\Psi_+$ in step 404 and a qWP $\Psi_-$ in step 406. A 2D transform is implemented in a tensor product mode, that is, by a sequential application of the 1D transforms to rows and columns of the 2D arrays. The image transform coefficients, which are the inner products of the image with shifts of the corresponding qWPs, are derived by an iterated multirate filtering of image. The 2D transform is applied separately to $\Psi_-$ and $\Psi_-$ to generate qWP-based filters $\Psi_{+-}$ and $\Psi_{+-}$, respectively, in step 408. $\Psi_{++}$ and $\Psi_{+-}$ are then used to generate directional oscillating qWPs $\theta_-=\text{Re}(\Psi_{--})$ and $\theta_-=\text{Re}(\Psi_{++})$ in step 410.

Figure 5:
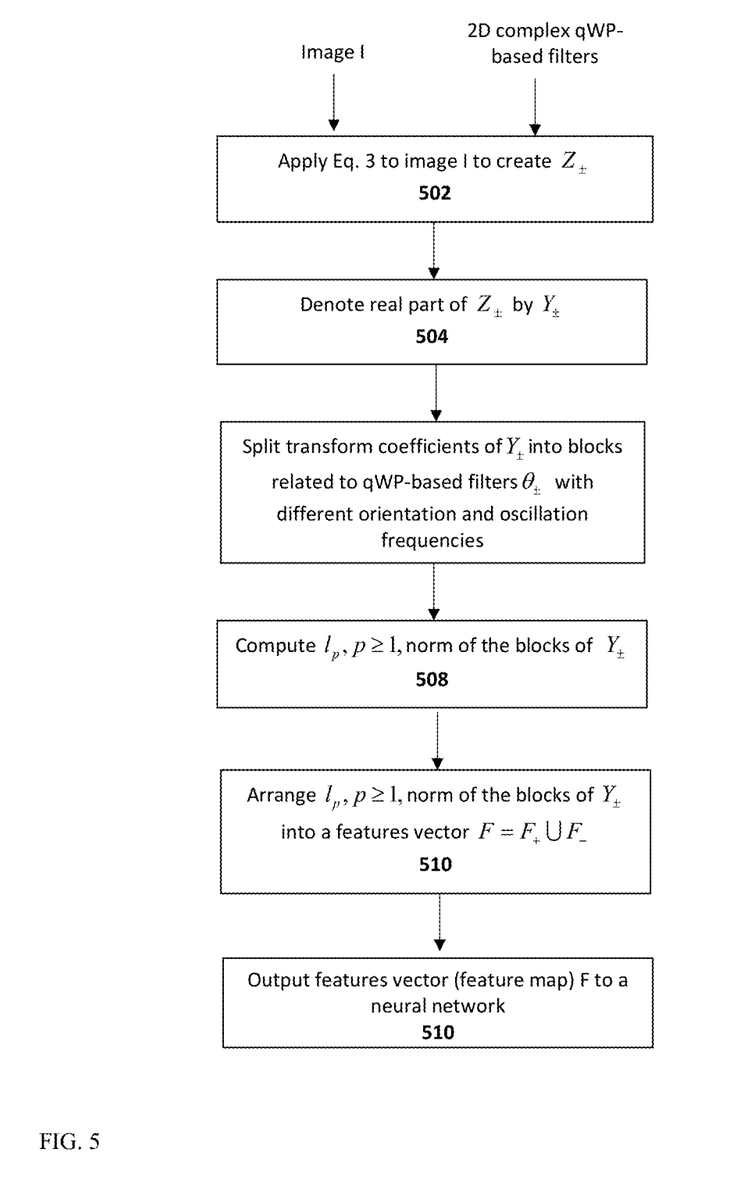
FIG. 5 shows the flowchart of the steps from the application of 2D complex qWPs to image till the generation of characteristic features map that are the input to neural networks.

FIG. 5 describes the flow of a process that generates characteristic features (feature map) of an image using the directional oscillating qWPs $\theta_+$ and $\theta_-$ described in FIG. 4, which are then fed to a neural network for classification and recognition by a modified CNN. The process in FIG. 5 starts with the input of qWP-based filters $\Psi_{+-}$ and $\Psi_{--}$ applied to an input image I in step 502 to create $Z_z$ (which denotes the qWPs transform coefficients) using Eq. 3. In step 504, the real part of $Z_z$, denoted by $Y_z$, represents the inner products of image I with the directional oscillating qWPs $\theta_z$ (where ± denotes $\theta_+$ and $\theta_-$). The transform coefficients of $Y_\pm$ are split into blocks that are related to qWPs $\theta_z$ in step 506, which have different orientations and oscillation frequencies. The blocks of $Y_z$ include patterns with certain orientations and certain oscillation frequencies of the image. The $l_p$, $p≥1$, norm of the blocks of $Y_z$ are computed in step 508. The $l_p$, $p≥1$, norm of the blocks are arranged in step 510 into a features vector $F=F_+\cup F_-$. Features vector F is fed in step 512 into a neural network.

Some advantages of using the process of step 304 instead of that of step 202 include: fast and accelerated classification computations, since there is no need to have either convolutional layers or huge data sets; universal waveforms and filters that do not depend on specific imaging; and construction of features that fit the structure of the image by using directional wavelet packet filters.

Figure 6:
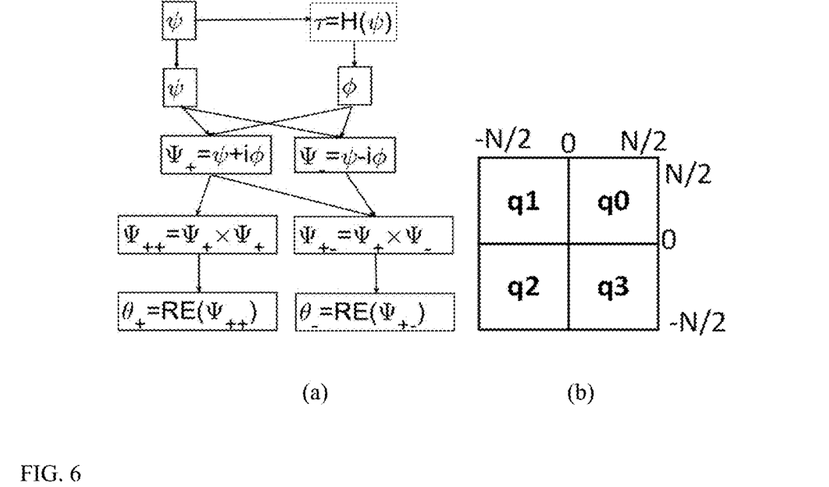
FIG. 6 illustrates in (a) a quasi-analytic wavelet packet (qWP) design and (b) quadrants of the frequency domain.

Following is a detailed enabling and exemplary way of implementing a method disclosed herein. The section titled "quasi-analytic directional wavelet packets" outlines the design of qWPs. The design used exemplarily the Hilbert transform (HT) of orthonormal spline-based wavelet packets (sWPs), originated from polynomial and discrete splines. Their shapes and spectra serve as building blocks for the design of the qWPs. The design scheme is illustrated by a diagram in FIG. 6. The sWPs are displayed in FIG. 7.

The set of the designed complex qWPs is described in the section titled "Directionality of real-valued 2D WPs". The qWP $\Psi_+$ consists of two groups $G_+=\{\Psi_{++}\}$ and $G_-=\{\Psi_{+-}\}$ whose discrete Fourier transform (DFT) spectra form a variety of tilings for quadrants $q_0$ and $q_1$, respectively (see FIG. 6), by squares of different sizes depending on the decomposition level. Consequently, the set of real qWPs (the real parts of the complex qWPs) consists of two groups $g_+=\{\theta_+=\mathrm{Re}\{G_+\}\}$ and $g_-=\{\theta_-=\mathrm{Re}\{G_-\}\}$ whose DFT spectra cover the quadrants pairs $q_0 \cup q_2$ and $q_0 \cup q_2$, respectively, where $g_+=q_0 \cup q_2$ and $g_-=q_1 \cup q_3$ (see part b in FIG. 6).

The size of the covering squares decreases according to the increase of the decomposition level. It is explained later how a "directional" structure of the qWPs spectra determines the structure of the respective waveforms (see Eq. 1). It is shown that the waveforms are close to windowed cosines with multiple frequencies oriented in multiple directions. The magnitude of the spectra of directional qWPs and the qWPs themselves are displayed in FIG. 7.

The section titled "WP transforms with quasi-analytics WPs" presents an exemplary scheme for signals and image transforms using the designed qWPs. An exemplary scheme for the 1D case is illustrated by a diagram in FIG. 11. 2D transforms are implemented in a tensor product mode, that is, by a subsequent application of 1D transforms to rows and columns of the 2D arrays. The signal/image transform coefficients, which are the inner products of the signal/image with shifts of the corresponding qWPs, are derived by an iterated multirate filtering of signal/image.

The section titled "Extraction of characteristic features" introduces characteristic features to be extracted from the images. The set of the transform coefficients of an image I consists of blocks. A block B comprises correlation coefficients of X with shifts of a certain qWP $\theta$, which is close to a windowed cosine with a certain frequency (in the spatial domain) that is oriented in a certain direction. Thus, the coefficients from block B testify about the presence of fragments in the image I that are oriented (approximately) and oscillating (approximately) as the qWP $\theta$. The average of moduli of the coefficients from block B is a measure of the contribution of such fragments to the image I. This average of the moduli is taken as a characteristic feature of image I that is related to qWP $\theta$. The collection of all features (feature map) characterizes the decompositions and oscillations distribution within image I. Note that the average of the moduli is just one possible measure, and other measures may be used as well.

Quasi-Analytic Directional Wavelet Packets

Figure 7:
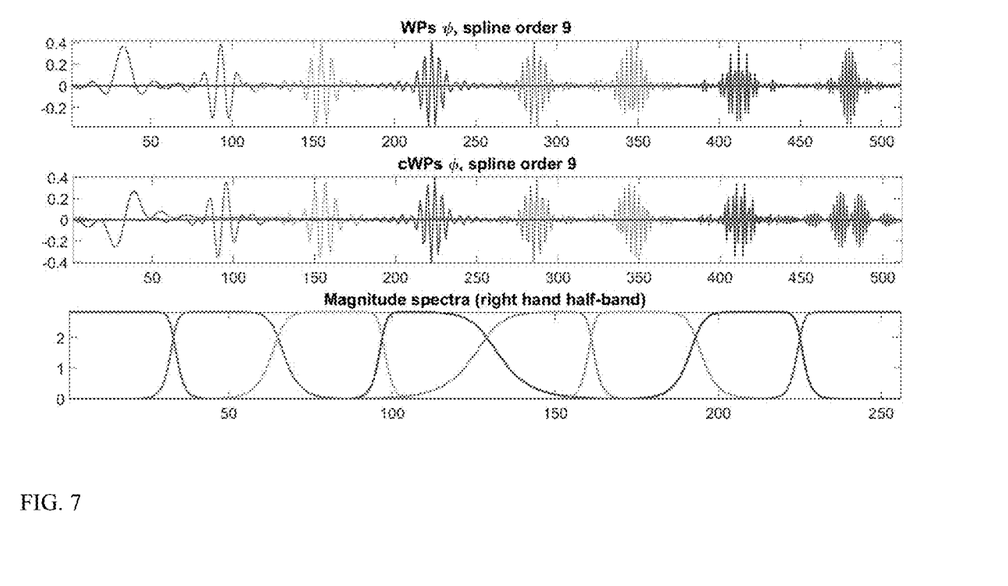
FIG. 7 shows spline-based wavelet packets (sWPs) $\{\psi_{[3],\lambda}\}$ from the third decomposition level (top), complimentary wavelet packets cWPs (center) and respective magnitude spectra (bottom)

The library of orthonormal wavelet packets originating from discrete and polynomial splines of multiple spline orders (sWPs) forms the building blocks for the design of directional wavelet packets as seen in FIG. 7. The waveforms in the library are symmetric (top), well localized in time domain, and their shapes vary from low-frequency smooth curves to high-frequency oscillating transients. They can have any number of local vanishing moments. Their spectra provide a variety of refined splits of the frequency domain. Shapes of the magnitude spectra tend to be rectangular as the spline's order increases (bottom). The 1D WPs belong to the space $\Pi[N]$ of N-periodic discrete time signals. Their tensor products possess similar properties extended to 2D setting but they lack a directionality. The 2D WPs belong to the space $\Pi[N,N]$ of N-periodic in the vertical and horizontal directions arrays.

In an example, design of directional WPs is achieved by the following steps:

1. The Hilbert transform is applied to the set $\{\psi\}$ of orthonormal sWPs thus producing the set $\{\tau=H(\psi)\}$—see a in FIG. 6;
2. The lowest-frequency and the highest-frequency waveforms from the set $\{\tau\}$ are modified to provide an orthonormal set $\{\phi\}$ of the complimentary WPs (cWPs), which are anti-symmetric (see middle signal in FIG. 7) and whose magnitude spectra coincides with the magnitude spectra of the respective WPs from the set $\{\psi\}$—see FIG. 6a;
3. Two sets of complex quasi-analytic WPs (qWPs) $\{\Psi_+=\psi+i\phi\}$ and $\{\Psi_-=\psi-i\phi\}$ (in FIG. 6a) whose spectra are localized in the positive and negative half-bands of the frequency domain respectively, are defined;
4. Two sets of 2D complex qWPs are defined by the tensor multiplication of the qWPs $\{\Psi_\pm\}$ such as $\{\Psi_{++} \triangleq \Psi_+ \otimes \Psi_+\}$ and $\{\Psi_{+-} \triangleq \Psi_+ \otimes \Psi_-\}$ (FIG. 6a));
5. The directional qWPs denoted by $\theta_+$ and $\theta_-$ are obtained as the real parts of the complex qWPs such that $\{\theta_+ \triangleq \mathrm{Re}(\Psi_{++})=\psi \otimes \psi - \phi \otimes \phi\}$ and $\{\theta_- \triangleq \mathrm{Re}(\Psi_{+-})=\psi \otimes \psi + \phi \otimes \phi\}$ —FIG. 6a.

Notation: There are $2^m$ 1D WPs of any kind (sWPs, cWPs and qWPs) at the m-th decomposition level, which are denoted by $\{\psi_{[m],\lambda}\}$, $\{\phi_{[m],\lambda}\}$ and $\{\Psi_{\pm[m],\lambda}=\psi_{[m],\lambda} \pm i\phi_{[m],\lambda}\}$, respectively, where $\lambda=0, \ldots, 2^m-1$. Consequently, there are $2^{2m}$ 2D tensor-product WPs, which are denoted by $\{\psi_{[m],\lambda,\mu}\},\{\phi_{[m],\lambda,\mu}\}$ and $\{\Psi_{\pm[m],\lambda,\mu}\}$, (respectively, where $\lambda,\mu=0, \ldots, 2^m-1$. Real 2D qWPs are denoted by $\{\theta_{\pm[m],\lambda,\mu}=\mathrm{Re}(\Psi_{\pm[m],\lambda,\mu})\}$.

FIG. 7 displays the symmetric orthonormal sWPs $\{\psi_{[3],\lambda}\}$(top signal), the antisymmetric orthonormal cWPs $\{\phi_{[3],\lambda}, \lambda=0, \ldots, 7,$ (middle signal) from the third decomposition level, and their magnitude spectra (bottom signal).

Figure 10:
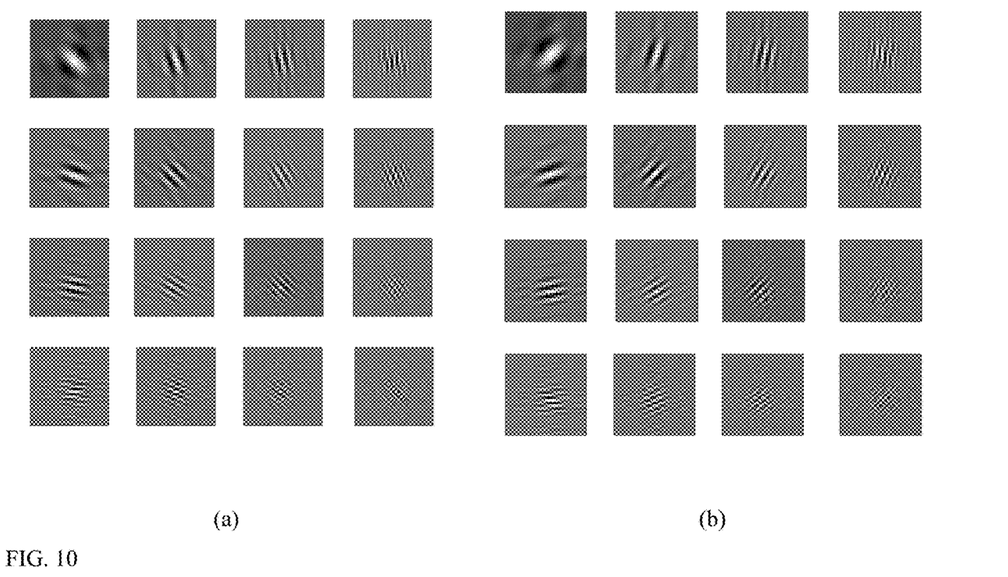
FIG. 10 shows in (a) 2D real qWPs $\{\theta_{+[2],\lambda,\mu}\}$ and in (b) $\{\theta_{-[2],\lambda,\mu}\}$, $\lambda,\mu=0,1,2,3$, from the second decomposition level.

A localized "directional" of the spectra of qWPs $\{\theta_+\}$ and $\{\theta_-\}$, seen in FIG. 10, determines the structure of the respective waveforms.

Directionality of Real-Valued 2D WPs

Assume, for example, that N=512, m=3, $\lambda=2$, $\mu=5$. Denote $\Psi[k,n] \triangleq \Psi_{++[3],2,5}[k,n]\theta[k,n] \triangleq \mathrm{Re}(\Psi[k,n])$. The spectrum $|\hat{\Psi}[\kappa,\nu]|$, displayed in FIG. 8 (left), effectively occupies the square of size 40×40 pixels centered around the point $C=[\kappa_0,\nu_0]$, where $\kappa_0=78$, $\nu_0=178$. Thus, the WP $\Psi$ is represented by $$\begin{aligned}
&\Psi[k, n] \\
&\underline{\Psi}[k, n] \\
&\left| \approx \frac{1}{N^2} \sum_{\kappa=\kappa_0-20}^{\kappa_0+19} \sum_{\nu=\nu_0-20}^{\nu_0+19} e^{2\pi i(\kappa k+\nu n)/N} \hat{\Psi}[\kappa, \nu] = e^{2\pi i(\kappa_0 k+\nu_0 n)} \underline{\Psi}[k, n] \right. \\
&\left| \approx \frac{1}{N^2} \sum_{\kappa,\nu=-20}^{19} e^{2\pi i(\kappa k+\nu m)/N} \hat{\Psi}[\kappa+\kappa_0, \nu+\nu_0] \right.
\end{aligned}$$ (1)

Figure 8:
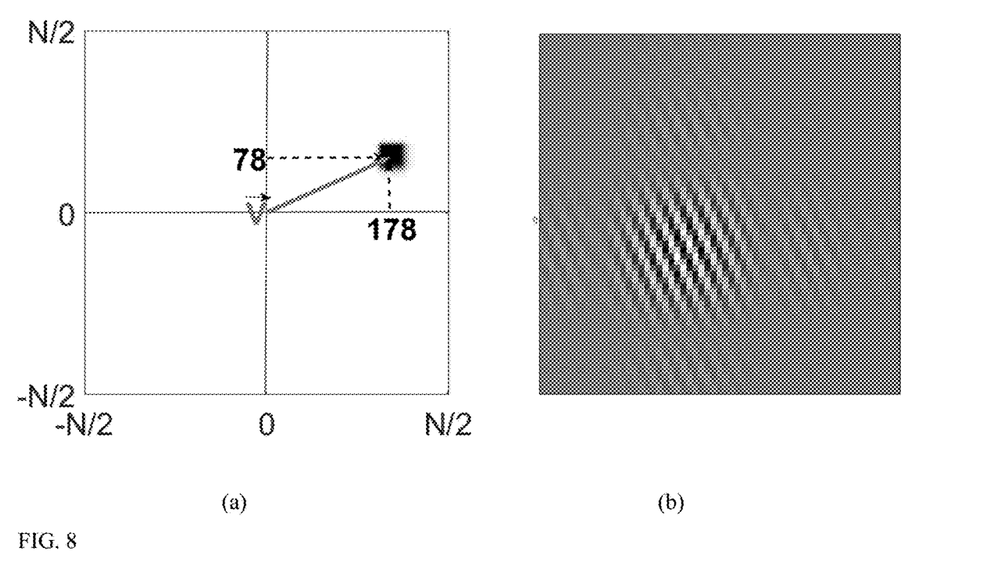
FIG. 8 shows in (a) a magnitude spectrum of 2D qWP $\Psi[k,n]$ and in (b) a 2D qWP $\theta[k,n]$ (magnified)

Consequently, the real-valued WP $\theta$ is represented as follows:

$$\theta[k,n] \approx \frac{2\pi(\kappa_0 k + v_0 n)}{N}\underline{\theta}[k,n], \quad \underline{\theta}[k,n] \triangleq \text{Re}(\underline{\Psi}[k,n]).$$

The spectrum of the 2D signal $\underline{\theta}$ comprises only low frequencies in both directions and it does not have a directionality, but the 2D signal $$\cos\frac{2\pi(\kappa_0 k + v_0 n)}{N}$$

oscillates in the direction of the vector $\vec{v} = 178\vec{i} + 78\vec{j}$. The 2D WP $\theta[k,n]$ is well localized in the spatial domain and the same is true for the low-frequency signal $\underline{\theta}$. Therefore, WP $\theta[k,n]$ can be regarded as the directional cosine modulated by the localized low-frequency signal $\underline{\theta}$.

Thus, shapes of the real qWPs $\{\theta_{\pm[m]}\}$ are close to windowed cosines with multiple frequencies (that depend on the distances of the corresponding frequency squares from the origin), which are oriented in multiple directions ($2(2^{m+1}-1)$ at level m). The qWPs $\{\theta_+\}$ are generally oriented to "north-east" (FIG. 10a), while the qWPs $\{\theta_-\}$ are oriented to "north-west" (FIG. 10b). Combinations of waveforms from the sets $\{\theta_+\}$ and $\{\theta_-\}$ provide a variety of frames in the space of 2D signals.

Figure 9:
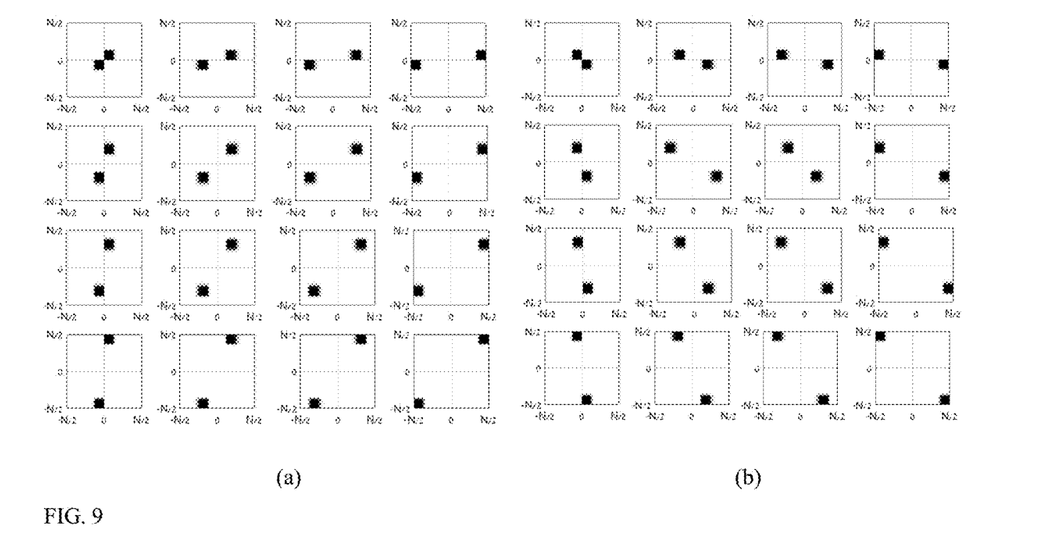
FIG. 9 shows in (a) magnitude spectra of 2D real qWPs $\{\theta_{+[2],\lambda,\mu}\}$ and in (b) $\{\theta_{-[2],\lambda,\mu}\}$ $\lambda,\mu=0,1,2,3$, from the second decomposition level.

The magnitude spectra of the real qWPs $\{\theta_+\}$ and $\{\theta_-\}$ from the second decomposition level are displayed in FIG. 9 and the qWPs $\{\theta_+\}$ and $\{\theta_-\}$ are shown in FIG. 10.

WP Transforms with Quasi-Analytic WPs

In an example, the qWP transforms are executed in the frequency domain using the Fast Fourier Transform (FFT). Assume that the signals to be processed belong to the space $\Pi[N]$ of N-periodic discrete-time signals where $N=2^j$.

The sets $Z_{\pm[m]}$ of the transform coefficients with the qWPs $\{\Psi_{\pm[m]}\}$ from the decomposition level m consist of $2^{m+1}$ wavelet blocks $Z_{\pm[m]} = \cup_{\lambda=0}^{2^m-1} Z_{\pm[m]\lambda}$ related to the $2^{m+1}$ qWPs $\{\Psi_{\pm[m],\lambda}\}$, $\lambda=0,\ldots,2^m-1$. The qWP transform coefficients of a signal $x=\{x[k]\}\in \Pi[N]$ are the correlation coefficients of x with the translations of the corresponding wavelet packets:

$$z_{\pm[m]\lambda}[k] = \langle x, \Psi_{\pm[m],\lambda}[\bullet - 2^m k]\rangle = \Sigma_{l=0}^{N-1}\Psi_{\pm[m],\lambda}^*[l-2^m k]x[l] = y_{[m]\lambda}[k] \pm i c_{[m]\lambda}[k]$$

$$y_{[m]\lambda}[k] = \langle x, \psi_{[m],\lambda}[\bullet - 2^m k]\rangle, \quad c_{[m]\lambda}[k] = \langle x, \varphi_{[m]\lambda}[\bullet - 2^m k]\rangle. \quad (2)$$

The transforms are implemented in a multiresolution mode by multirate filtering. The structure of the filter bank for the transform of a signal x to the first decomposition level differs from the structure of the filter banks for subsequent levels. Define the filters $P_\lambda$, $F_\lambda$, $Q_{\pm\lambda}$ by their impulse responses:

$$p_\lambda[k] = \psi_{[1],\lambda}, f_\lambda[k] = \phi_{[1],\lambda}, [q_{\pm\lambda}[k] = p_\lambda[k] \pm i f_\lambda[k],$$
$$k=0,\ldots,N-1, \lambda=0,1.$$

The four blocks $Z_{+[1],0} \cup Z_{+[1],1} \cup Z_{-[1],0} \cup Z_{-[1],1}$ of the first-level transform coefficients are derived by filtering the signal x followed by down-sampling, such as $z_{\pm[1],\lambda}[k] = \Sigma_{l=0}^{N-1} q_{\pm\lambda}[l-2k]x[l]$, $\lambda=0,1$.

The frequency responses of the filters $P_\lambda$ are $\hat{p}_\lambda[n] = \Sigma_{k=0}^{N-1} e^{2\pi i k n/N} p_\lambda[k] = \hat{\psi}_{1,[\lambda]}[n]$, $n=0,\ldots,N-1$, $\lambda=0,1$. The filters $P_{[m]\lambda}$, $m=1,\ldots,M$, $\lambda=0,1$ for the transform from the first to the subsequent decomposition levels are defined via their frequency responses: $\hat{p}_{[m]\lambda}[n] = \hat{p}_\lambda[2^m n]$, $m=1,\ldots,M$, $\lambda=0,1$. Thus, the qWP transform from the first to the second decomposition level is $$z_{\pm[2]0}[k] = \Sigma_{l=0}^{N/2-1} p_{[1]0}[l-4k] z_{\pm[1]0}[l] \quad z_{\pm[2]1}[k] = \Sigma_{l=0}^{N/2-1} p_{[1]1}[l-4k] z_{\pm[1]0}[l]$$

$$z_{\pm[2]2}[k] = \Sigma_{l=0}^{N/2-1} p_{[1]1}[l-4k] z_{\pm[1]1}[l] \quad z_{\pm[2]3}[k] = \Sigma_{l=0}^{N/2-1} p_{[1]0}[l-4k] z_{\pm[1]1}[l]$$

Figure 11:
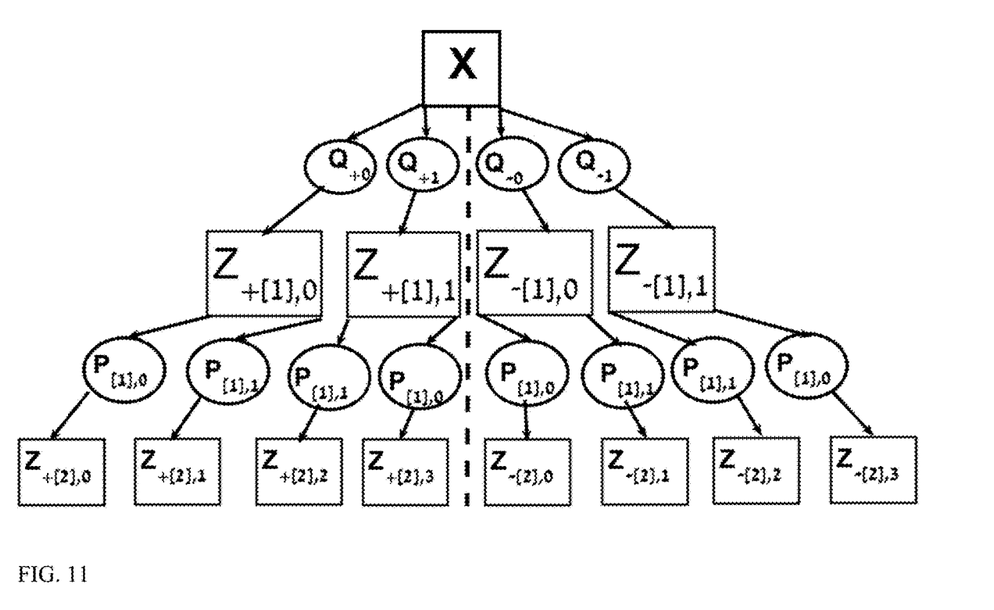
FIG. 11 shows a diagram of the 1D qWP transform down to the second level.

The transforms to the subsequent decomposition levels are executed similarly using the filters $P_{[m],\lambda}$, $m=2,\ldots,M$, $\lambda=0,1$. The diagram in FIG. 11 illustrates the qWP transform implementation. The 2D transforms of an image X of size N×N are executed in a tensor product mode involving application of 1D transforms with the filters $Q_{\pm\lambda}$, $\lambda=0,1$, to rows of the image I, which is followed by application of the transform to the columns of the derived coefficient arrays. Thus, eight coefficient arrays of size N/2×N/2 are produced: $\{Z_{+[1],\lambda,\mu}, Z_{-[1],\lambda,\mu}, \lambda,\mu=0,1\}$. Then, the coefficient arrays are processed in the same way but using the filters $P_{[m]\lambda}$, $m=2,\ldots,M$, $\lambda=0,1$ instead of $Q_{\pm\lambda}$, $\lambda=0,1$. Arrays related to the "positive" qWPs $\Psi_{++}$ and arrays related to the "negative" qWPs $\Psi_{+-}$ are processed separately, forming a double-tree structure. At the second level one gets 32 coefficient arrays $\{Z_{+[2],\lambda,\mu}, Z_{-[2],\lambda,\mu}, \lambda,\mu=0,1,2,3\}$ of size N/4×N/4 and so on—see FIG. 12.

Extraction of characteristic features (feature maps): the connection between universal waveforms and wavelet packets coefficients generated by universal filtering $P_\lambda$, $F_\lambda$, $Q_{\pm\lambda}$ The qWP transform coefficients are the inner products of image X with 2D complex qWPs:

$$z_{\pm[m],\lambda,\mu}[k,n] = \sum_{\kappa,\upsilon=0}^{N-1} \Psi_{\pm[m],\lambda,\mu}[\kappa - 2^m k, \upsilon - 2^m n]^* X[\kappa,\upsilon] = \quad (3)$$

$$y_{\pm[m],\lambda,\mu}[k,n] + i c_{\pm[m],\lambda,\mu}[k,n].$$

Consequently, the coefficients $y_{\pm[m],\lambda,\mu}[k,n] = \text{Re}(z_{\pm[m],\lambda,\mu}[k,n])$ are the correlation coefficients of image X with the directional qWPs $\theta_{\pm[m],\lambda,\mu}[\bullet - 2^m k, \bullet - 2^m n] = \text{Re}(\Psi_{\pm[m],\lambda,\mu}[\bullet - 2^m k, \bullet - 2^m n])$. As mentioned, the qWPs $\{\theta_{\pm[2],\lambda,\mu}, \lambda,\mu=0,1,2,3\}$ from the second decomposition level are displayed in FIG. 10.

Denote by $B_{+[m],\lambda,\mu} \triangleq +\{y_{+[m],\lambda,\mu}[k,n]\}_{k,n=0}^{N/2^m-1}$, $\lambda,\mu=0,\ldots,2^m-1$, the block of the transform coefficients related to qWP $\theta_{+[m],\lambda,\mu}$. qWP $\theta_{+[m],\lambda,\mu}$ is oriented in some direction $d_{+[m],\lambda,\mu}$ along an angle $\beta_{+[m],\lambda,\mu}$ $$\left(\sin \beta_{+[m],\lambda,\mu} \approx \frac{\lambda}{\mu}\right)$$

and is oscillating with a frequency $f_{+[m],\lambda,\mu}$, which is proportional to the distance of the point $(\lambda,\mu)$ from the origin. Thus, the coefficients from the block $B_{+[m],\lambda,\mu}$ testify to the presence of fragments oriented along (approximately) the angle $\beta_{+[m],\lambda,\mu}$ and oscillating with (approximately) the frequency $f_{+[m],\lambda,\mu}$ in the image X.

The value $$F_{+[m],\lambda,\mu} \triangleq \left(\frac{2^m}{N}\right) \sum_{k,n=0}^{N/2^m-1} |y_{+[m],\lambda,\mu}[k,n]| \quad F_{+[m],\lambda,\mu} \triangleq \left(\frac{2^m}{N}\right) \sum_{k,n=0}^{N/2^m-1} |y_{+[m],\lambda,\mu}[k,n]| \quad (4)$$

is a measure of the contributions of such fragments into the image X.

Figure 12:
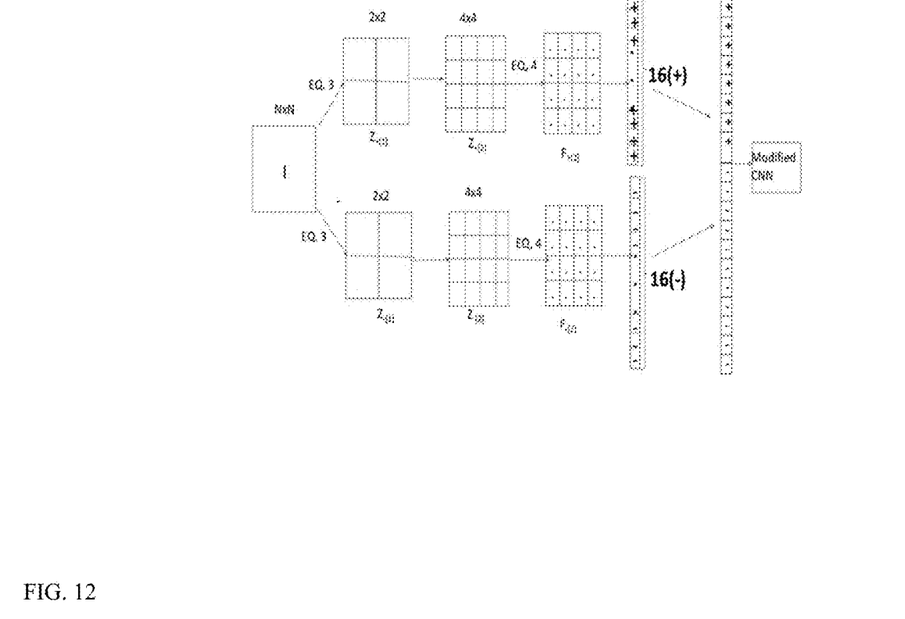
FIG. 12 describes a schematic way for generating the feature maps described in FIG. 3.

FIG. 12 describes an exemplary schematic way for generating the feature maps as described in steps 304 and 306 in FIG. 3. In this example, the image is decomposed into two levels that generates 2×2 and 4×4 blocks from the image using positive qWPs (top boxes) and negative qWPs (bottom boxes). They are convolved with predefined filters as described in Eq. 3. The number of partitions of each image to blocks in each level and the number of decomposition levels are free parameters. The positive and negative features maps, which are concatenated into one vector, are generated by Eq. 4 using for example the h norm. Other norms such as $l_2$ or others can also be used.

Figure 13:
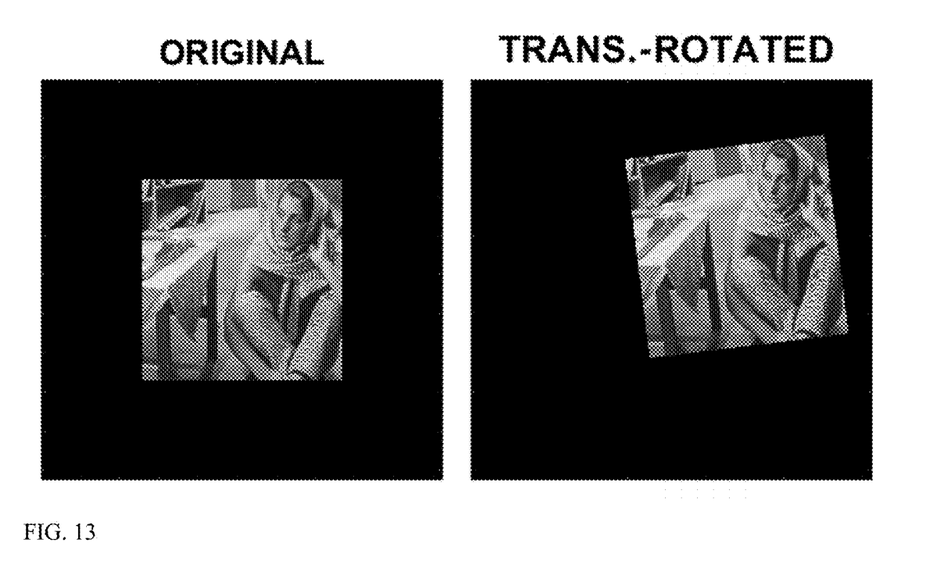
FIG. 13 shows on the left the original image and on the right the translated and rotated (TR) of left image.

Denote by $F_{+[m]}$ the level-m feature map (FM), which is the 2D array $F_{+[m]} \triangleq \{F_{+[m],\lambda,\mu}\}_{\lambda,\mu=0}^{2^m-1}$ of size $2^m \times 2$. The feature map $F_{-[m]}$ is derived in the same way as $F_{+[m]}$. The combined level-m FM $F_{[m]} \triangleq F_{+[m]} \cup F_{-[m]}$ characterizes the directions and oscillations distribution within image X. The transition from the decomposition level m to level m+1 refines that distribution at the cost of having a wider support of testing waveforms $\theta_{\pm[m+1],\lambda,\mu}$ compared to that of $\theta_{\pm[m],\lambda,\mu}$. The FMs $F_{[m]}$ are invariant about translations of an object within the image and are stable about moderate rotations such as FIG. 13 (left original, right translated and rotated).

Each qWP transform coefficient of an image I has a certain physical meaning: it evaluates the presence of an event with a certain direction that is oscillating with a certain frequency in a certain patch of the image. The FMs defined in Eq. 4 inherited these properties except for the localization in the image. Utilization of these physical meanings of the transform coefficients makes it possible to design a variety of feature extraction schemes that can be optimized for different classes of problems. It is worth mentioning the variability of the qWP libraries (choice between the generating polynomial and discrete splines and selection of spline's order). There is an option to extend the FMs by the usage of the imaginary $c_{\pm[m],\lambda,\mu}[k,n]$ together with real $y_{\pm[m],\lambda,\mu}[k,n]$ parts of the transform coefficients (see Eqs. 3 and 4). Various pooling methods are possible.

Figure 14:
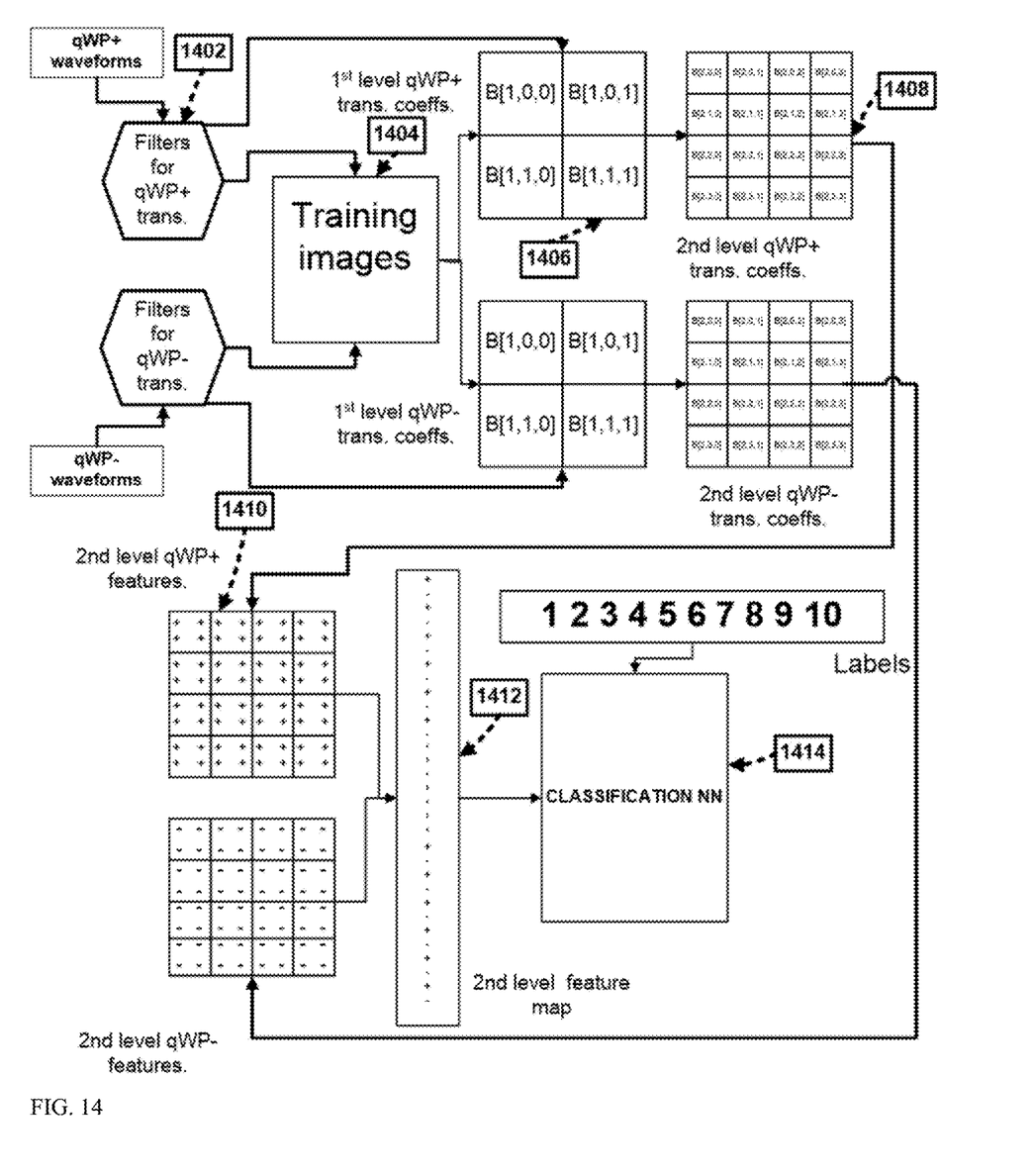
FIG. 14 shows an end-to-end schematic flow of the training procedure that generates feature maps.
Figure 15:
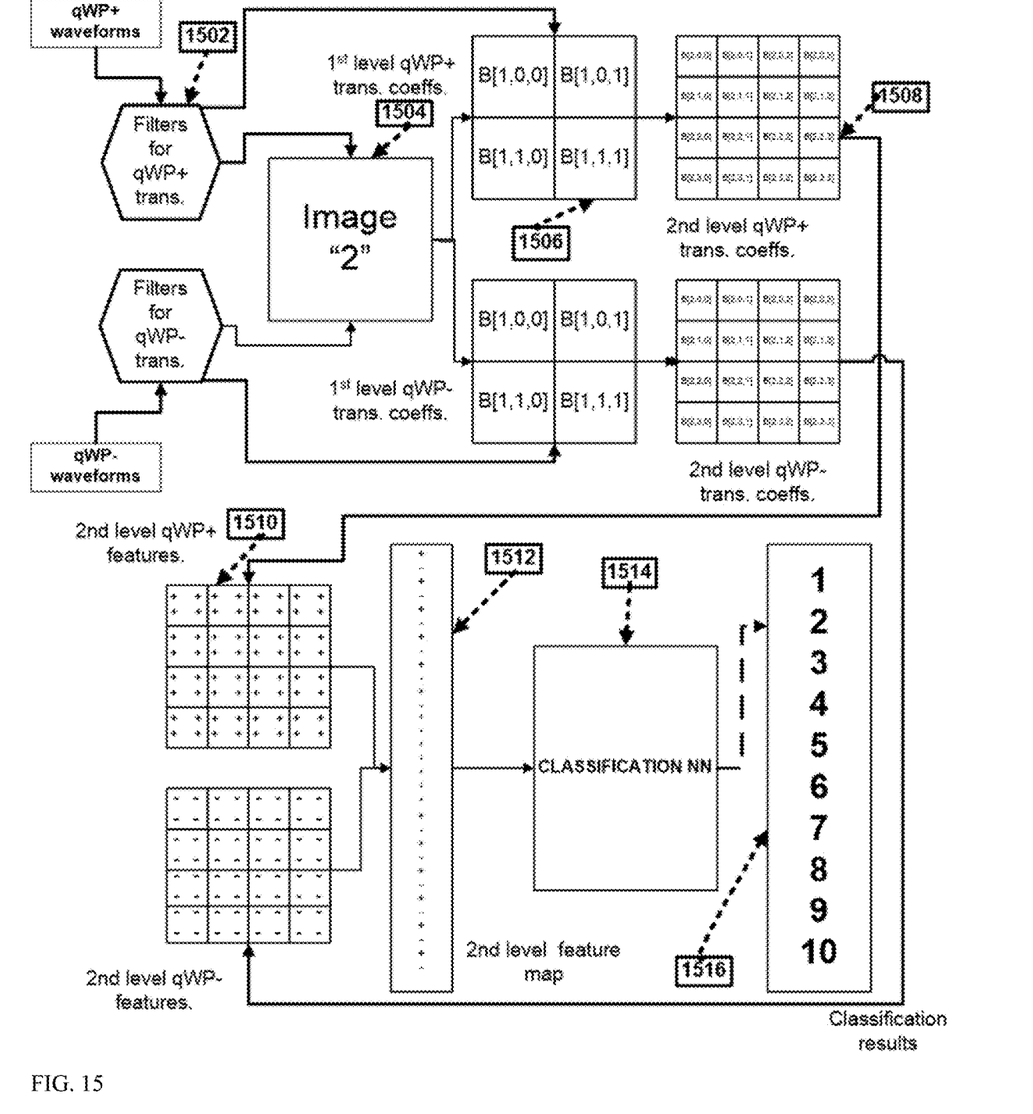
FIG. 15 shows an end-to-end schematic flow of the classification procedure.

FIGS. 14 and 15 provide detailed descriptions of the activities in step 302, 304 and 306 in FIG. 3. FIG. 14 describes the feature maps generation during the training process. The description focuses on the positive aspects of qWPs. For each description on positive qWPs there is analogous description on negative qWPs. In 1402, filters for qWPs+ transforms from qWPs+ waveforms are generated. The filters are applied to the training image in 1404 using Eq. 3. From this, 2×2 blocks in a first decomposition level are generated in 1406. The filters for qWPs+ in 1402 are applied to 1406 to generate in 1408 a 4×4 block in a second decomposition level. Eq. 4 uses for example the h nom to generate the 4×4 blocks in 1410. The entries in 1410 are the "positive" entries in a feature maps vector 1412. As mentioned, the same procedure is applicable to filters for qWPs– transforms. The vector of feature maps in 1412, which is concatenated from "positive" and "negative" feature maps, is the input with the given labels to neural nets-based classification in block 1414.

FIG. 15 describes the same operation as FIG. 14 with the following differences: the filters for the qWPs+ and qWPs– operate on a newly arrived input in 1504. Here the image numeral "2" is a specific illustrating example. The new image goes through the same steps as in FIG. 14 to generate a feature map in 1512. This new feature map is classified by the neural net in 1514 to generate the classified output in 1516. Blocks 1502, 1506, 1508 and 1510 are identical with blocks 1402, 1406, 1408 and 1410.

The number of partitions of each image to blocks in each level and the number of decomposition levels are free parameters, and they are determined in FIG. 15 according to what was determined in FIG. 14. All the free parameters determined in FIG. 14 (such as the chosen norm in Eq. 4) are used in FIG. 15.

Several computational components in FIGS. 14 and 15 such as computing the + and – sections and the blocks 1404, 1406, 1408, 1410, 1504, 1506, 1508, 1510 can be processed in parallel in various types of processors. For example, they may be processed in a graphic processing unit (GPU).

Example of Results

We have conducted several experiments in order to test and demonstrate the feasibility of the qWP-based features extraction methods to fit image classifications by modifying DCNN. The feasibility tests were carried out on MNIST (called MNIST database).

We use the library of directional spline-based qWPs whose design is described above to show that the extracted features (feature maps) can reduce substantially the size of the training data and thus speedup the classification.

The results presented below confirm that directional wavelet packets originating from splines have the potential to be a constructive tool for high quality features extraction from images. We show here that these features can serve as a substitute for several or even all the convolutional layers in DCNNs architecture. The extracted features have adaptation capabilities to the image activities. Classification is made significantly faster and more efficient because of the need for fewer images and use of no (or very few) convolutional layers.

MNIST Database

The feasibility to achieve classification in images by a small training dataset while evaluating the performance of qWPs was tested for the extracted features from the MNIST database of handwritten digits. Sets $S_{5000}$, $S_{4000}$, $S_{3000}$, $S_{2000}$ and $S_{1500}$ comprising respectively 5000, 4000, 3000, 2000 and 1500 MINST images of size 28×28 were taken as the reference data (RD). Each image was padded by zeroes to have an expanded size of 64×64, see FIG. 13. A four level qWP 2D transform was applied to each expanded image. 512 features $F_{[4]} \triangleq F_{+[4]} \cup F_{-[4]}$, from the fourth decomposition level were extracted from each image. Seven sets of FMs $\Phi_M$ were generated, where M=5000, 4000, 3000, 2000, 1500, 1000, 500. The same processing was applied to the set $T_{5000}$ of 5000 images from the MNIST database.

As decision units, simple non-convolution NNs $N_M$ trained on the 7 sets of FMs were used. The trained NNs were used for classification of the images from set $T_{5000}$. The NN comprised one input layer of one long short-term memory (LSTM). LSTM is an artificial recurrent neural network (RNN) architecture used in the field of machine learning and deep learning. LSTM has two to five fully connected layers and a softmax function is used as the activation function in the output layer of neural network models. No convolution layer was used and the neural network was used without any optimization.

The qWPs transform coefficients are the inner products of the MINST data with 2D complex qWPs by EQ. 3 which is a 2D convolution of the image with T and the real part of the output from the convolution is used in EQ. 4 for deriving the feature maps.

The classification results for set $T_{5000}$ are given in Table 1:

TABLE 1

| NN | $N_{5000}$ | $N_{4000}$ | $N_{3000}$ | $N_{2000}$ | $N_{1500}$ | $N_{1000}$ | $N_{500}$ |
|---|---|---|---|---|---|---|---|
| Classification % | 97.72 | 97.12 | 96.78 | 95.78 | 94.76 | 93.08 | 90.16 |

The classification results on the MINST database in Table 1 are compared with the results reported in http://yann.lecun.com/exdb/mnist (Yann LeCun, Corinna Cortes, Christopher J. C. Burges, "The MNIST database of handwritten digits"), where a conventional state of the art CNN was used for feature extraction and classification. Their training set included 60000 datapoints and their test set included 10000 datapoints, in sharp contrast with our training set of on average 3000 datapoints (images) and a test set of 5000 datapoints. While the classification accuracies using both methods are comparable, the conventional CNN of LeCun used 20 times more training images than the ones used to generate Table 1. That is, a "modified CNN" disclosed herein achieves similar accuracy to that of a conventional CNN, but needs only $1/20^{th}$ of the number of training images. A better neural network than the elementary (non-optimized) one that was used to achieve the results in Table 1 will probably require even fewer training images. This speeds up the computation time and memory consumption of a processor in a system running the method.

Figure 16:
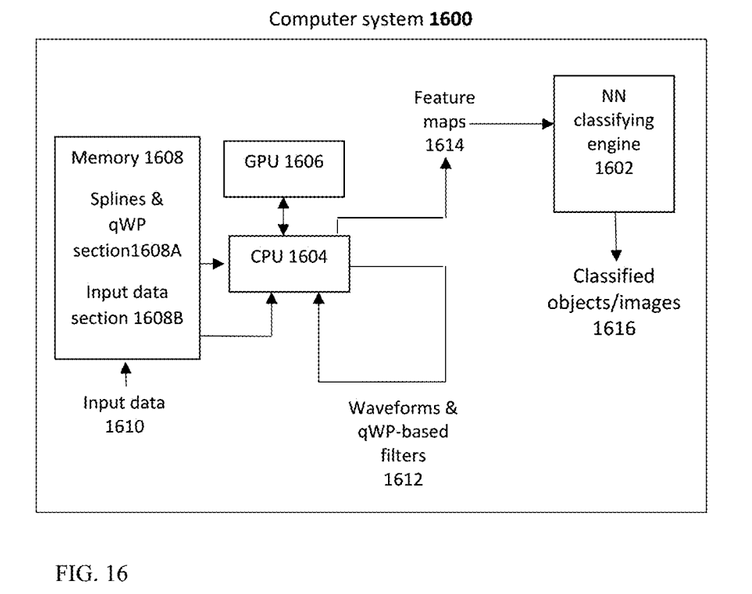
FIG. 16 illustrates in a block diagram a system according to aspects of the presently disclosed subject matter.

A method described above may be performed for example in a computer system described with reference to FIG. 16. The figure illustrates schematically in a block diagram a computer system 1600 that may comprise an object classification through neural networks engine ("classifying engine") 1602. Classifying engine 1602 is configured to classify objects in computer system 1600 using a method disclosed above. Computer system 1600 may include a processor ("processing unit"), for example a central processing unit (CPU) 1604, a GPU 1606 and a memory 1608. Memory 1608 may include a first memory section 1608A and a second memory section 1608B.

Computer system 1600 may receive inputs from a variety of data sources 1610. The inputs may be received through an interface or input/output (I/O) device (not shown). Non-limiting examples of data sources 1610 may include (in addition to the MNIST database above):
  Waymo (https://waymo.com), formerly the Google self-driving car project;
  Classification of X-rays images on Osteoarthrosis knees, https://doi.org/10.6084/m9._gshare.8139545.v1, 2019;
  CheXpert69, Stanford Hospital, 224,316 chest radiographs from 65,240 patients, presence/absence of 14 pathologies; Data input to classifying engine 1602 may be of versatile structure and formats, and their volume and span (the number of parameters) may be theoretically unlimited. Computer system 1600 may also be referred to as a "modified CNN" system.

In an exemplary use case, in an initial (training) processing stage (or phase), splines and qWPs are loaded into memory section 1608A. The splines and the qWPs are processed by CPU 1604 to generate waveforms and qWP-based filters 1612. The waveforms and qWP-based filters are generated independently of the imaging data. In the training stage, the input data is loaded and stored into memory section 1608B. The input data is processed in CPU 1604 using waveforms and qWP-based filters 1612. In addition and/or optionally, some of the processing above may be carried out in GPU 1606. The CPU-GPU based processing generates a training-data based feature map 1614 for each input image. The training data-based feature maps are input to neural network classifying engine 1602. This completes the training stage.

In a second, classification stage, a newly arrived image, which did not participate in the training stage, is processed in CPU 1604 (or in addition and/or optionally in GPU 1606) using the waveforms and qWP-based filters 1612 generated in the training stage, to generate a new feature map 1614. NN classifying engine 1602 uses the training-based feature maps and the new feature map for classification of at least one object in the new image and/or of the entire new image to output a classified object/image 1616 to a user. The output may be done through an interface or I/O device (not shown). The user may be for example a driver of a vehicle, a controller of an autonomous vehicle, a physician or surgeon (for medical image data), etc.

Figure 17:
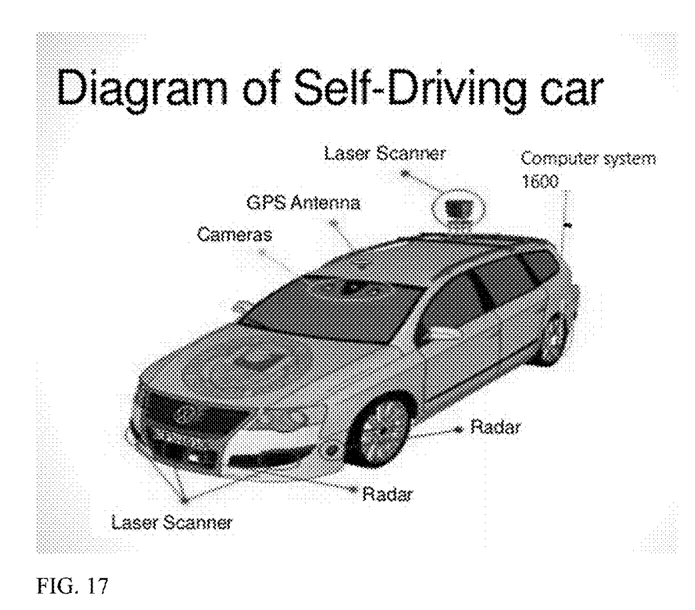
FIG. 17 shows a vehicle incorporating a system for implementing a method disclosed herein.

In an exemplary application, a computer system like system 1600 running a method disclosed herein may be incorporated in a vehicle (see FIG. 17) to process images acquired by cameras and/or other sensors (e.g. radars, laser scanners, etc.) in the vehicle to provide real-time inputs for autonomous driving. For example, the classified object may be a person, a pedestrian, a cyclist, another vehicle, an obstacle on a road, a traffic sign, etc.

In conclusion, the proposed replacement of the convolutional layers in DCNN architecture, followed by the application of directional wavelet packets to small data sizes, leads to a construction that extracts features with a performance achieved by a fully equipped DCNN with much bigger datasets and with a larger number of convolutional layers.

Some stages of the aforementioned methods may also be implemented in a computer program for running on the computer system, at least including code portions for performing steps of the relevant method when run on a programmable apparatus, such as a computer system or enabling a programmable apparatus to perform functions of a device or system according to the disclosure. Such methods may also be implemented in a computer program for running on the computer system, at least including code portions that make a computer execute the steps of a method according to the disclosure.

A computer program is a list of instructions such as a particular application program and/or an operating system. The computer program may for instance include one or more of: a subroutine, a function, a procedure, a method, an implementation, an executable application, an applet, a servlet, a source code, code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

The connections discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Optionally, the illustrated examples may be implemented as circuitry located on a single integrated circuit or within a same device. Alternatively, the examples may be implemented as any number of separate integrated circuits or separate devices interconnected with each other in a suitable manner. Optionally, suitable parts of the methods may be implemented as soft or code representations of physical circuitry or of logical representations convertible into physical circuitry, such as in a hardware description language of any appropriate type.

Other modifications, variations and alternatives are also possible. The specifications and drawings are, accordingly, to be regarded in an illustrative rather than in a restrictive sense. While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure. It will be appreciated that the embodiments described above are cited by way of example, and various features thereof and combinations of these features can be varied and modified. While various embodiments have been shown and described, it will be understood that there is no intent to limit the disclosure by such disclosure, but rather, it is intended to cover all modifications and alternate constructions falling within the scope of the disclosure, as defined in the appended claims.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

What is claimed is:

1. A method, comprising:
    applying quasi-analytical directional wavelet packet (qWP)-based filtering to image data to extract feature maps, wherein the applying includes applying the qWP-based filtering to training image data to extract training-based feature maps in a training stage, and applying the qWP-based filtering to a new image to extract a new feature map in a classification stage;
    applying neural network (NN) processing to the extracted new feature map to classify an object in the new image and/or the new image; and
    outputting the classified object and/or the new image to a user.

2. The method of claim 1, wherein the applying qWP-based filtering to image data is preceded by generating qWPs using discrete or polynomial splines, and by using the generated qWPs to obtain the qWP-based filters.

3. The method of claim 1, wherein the applying of NN processing to the extracted new feature map to classify the object and/or image includes using the training-based feature maps and the new feature map for classification of the object in the new image and/or of the entire new image.

4. The method of claim 1, wherein the processing unit is a graphic processing unit.

5. The method of claim 1, wherein the method is performed in a vehicle.

6. The method of claim 1, wherein the neural network is a convolutional neural network.

7. A system, comprising:
    a processing unit configured to apply quasi-analytical directional wavelet packet (qWP)-based filtering to image data to extract feature maps, wherein the configuration includes a configuration to apply the qWP-based filtering to training image data to extract training-based feature maps in a training stage, and to apply to qWP-based filtering to a new image to extract a new feature map in a classification stage;
    a neural network (NN) classifying engine configured to apply NN processing to the extracted feature maps to classify an object in the new image and/or the new image; and
    an interface or input/output device for outputting the classified object and/or the new image to a user.

8. The system of claim 7, wherein the processing unit configuration to apply qWP-based filtering to image data to extract feature maps includes a configuration to generate qWPs using discrete or polynomial splines, and to use the generated qWPs to obtain qWP-based filters used in the qWP-based filtering.

9. The system of claim 7, wherein the NN classifying engine configuration to apply NN processing to the extracted feature maps to classify the object and/or the image includes a configuration to use the training-based feature maps and the new feature map to classify the object in the new image and/or the entire new image.

10. The system of claim 7, wherein the processing unit is a graphic processing unit.

11. The system of claim 7, wherein the system is included in a vehicle.

12. The system of claim 7, wherein the neural network is a convolutional neural network.

13. A method, comprising:
  replacing convolutional layers of a convolutional neural network (CNN) with quasi-analytic directional wavelet packet (qWP)-based filters;
  using the qWP-based filters to perform filtering and extract features from training image data, wherein the using includes applying the qWP-based filtering to training image data to extract training-based feature maps in a training stage, and applying the qWP-based filtering to a new image to extract a new feature map in a classification stage;
  using fully connected layers of the CNN to perform a classification task using the extracted features to classify an object in the new image and/or the new image; and
  outputting the classified object and/or the new image to a user.

14. The method of claim 13, wherein the replacing of the convolutional layers of the CNN with qWP-based filters includes replacing all of the convolutional layers of the CNN with the qWP-based filters.

15. The method of claim 13, wherein the replacing of the convolutional layers of the CNN with qWP-based filters is preceded by generating qWPs using discrete or polynomial splines, and by using the generated qWPs to obtain the qWP-based filters.

16. The method of claim 13, wherein the using of fully connected layers of the CNN to perform a classification task using the extracted features includes using the training-based feature maps and the new feature map to perform the classification task.

17. The method of claim 13, wherein the method is performed in a vehicle.

\* \* \* \* \*